United States Patent Office 3,330,865
Patented July 11, 1967

3,330,865
POLYSULFONAMIDE CHEMICAL INTERMEDIATES FOR ADHESIVES AND RESINS
Bill Davis, Fort Worth, Tex., assignor, by mesne assignments, to the United States of America as represented by the Secretary of the Air Force
No Drawing. Filed July 7, 1961, Ser. No. 122,401
6 Claims. (Cl. 260—556)

My invention relates in general to chemical intermediates and more particularly to chemical intermediates having particular utility in the preparation of both epoxy and phenol-formaldehyde resins and adhesives which are characterized by improved resistance to heat distortion.

It is an object of this invention to improve the heat distortion resistance of both phenol-formaldehyde resins and epoxy resins by utilizing the novel compounds hereof as intermediates in resin formulation. The heat distortion of the epoxy resins is typically in the vicinity of 280° F. and for phenol-formaldehyde resins is in the range of from approximately 240° F. to 260° F. In contrast, the epoxy resins produced using the chemical intermediates of this invention have a heat distortion temperature of 480° F. and the phenol-formaldehyde resins similarly so produced have a heat distortion temperature of 450° F. It is therefore apparent that the chemical compounds of this invention are extremely effective in improving the heat distortion characteristics of epoxy and phenol-formaldehyde resins.

Under the teachings of this invention an aromatic polysulfonyl chloride is reacted with a primary aminophenol to produce a chemical intermediate which can be converted to produce novel epoxy and phenol-formaldehyde resins having greater heat distortion temperatures than achieved heretofore.

For example, N,N'-bis(4-hydroxyphenyl) 1,4-benzenedisulfonamide which has a melting point of 280° C. and the formula:

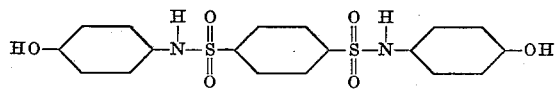

is produced by reacting 1,4-benzenedisulfonyl chloride of the formula:

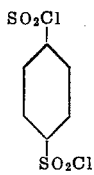

with para aminophenol (4-aminophenol) of the formula:

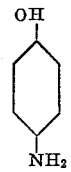

The following intermediates have also been prepared according to the teachings of this invention from the ingredients indicated.

| Intermediates: | Melting point, °C. |
|---|---|
| N,N'-bis(3-hydroxyphenyl) 1,4-benzenedisulfonamide 1,4-benzenedisulfonyl chloride + meta aminophenol (3-aminophenol) | 242 |
| N,N'-bis(2-hydroxyphenyl) 1,4-benzenedisulfonamide 1,4-benzenedisulfonyl chloride + ortho aminophenol (2-aminophenol) | 273 |
| N,N'-bis(4-hydroxyphenyl) 1,3-benzenedisulfonamide 1,3-benzenedisulfonyl chloride + para aminophenol (4-aminophenol) | 193 |
| N,N'-bis(3-hydroxyphenyl) 1,3-benzenedisulfonamide 1,3-benzenedisulfonyl chloride + meta aminophenol (3-aminophenol) | 191 |
| N,N'-bis(2-hydroxyphenyl) 1,3-benzenedisulfonamide 1,3-benzenedisulfonyl chloride + ortho aminophenol (2-aminophenol) | 187 |
| N,N'-bis(4-hydroxyphenyl) 4,4'-biphenyldisulfonamide 4,4'-biphenyldisulfonyl chloride + para aminophenol (4-aminophenol) | 287 |
| N,N'-bis(3-hydroxyphenyl) 4,4'-biphenyldisulfonamide 4,4'-biphenyldisulfonyl chloride + meta aminophenol (3-aminophenol) | 145 |
| N,N'-bis(2-hydroxyphenyl) 4,4'-biphenyldisulfonamide 4,4'-biphenyldisulfonyl chloride + ortho aminophenol (2-aminophenol) | 280 |
| N,N'-bis(4-hydroxyphenyl) 1,5-naphthalenedisulfonamide 1,5-naphthalenedisulfonyl chloride + para aminophenol (4-aminophenol) | 290 |
| N,N'-bis(3-hydroxyphenyl) 1,5-naphthalenedisulfonamide 1,5-naphthalenedisulfonyl chloride + meta aminophenol (3-aminophenol) | 226 |
| N,N'-bis(2-hydroxyphenyl) 1,5-naphthalenedisulfonamide 1,5-naphthalenedisulfonyl chloride + ortho aminophenol (2-aminophenol) | 250 |
| N,N',N''-tris(4-hydroxyphenyl) 1,3,5-benzenetrisulfonamide 1,3,5-benzenetrisulfonyl chloride + para aminophenol (4-aminophenol) | 245 |
| N,N',N''-tris(3-hydroxyphenyl) 1,3,5-benzenetrisulfonamide 1,3,5-benzenetrisulfonyl chloride + meta aminophenol (3-aminophenol) | 115 |
| N,N',N''-tris(2-hydroxyphenyl) 1,3,5-benzenetrisulfonamide 1,3,5-benzenetrisulfonyl chloride + ortho aminophenol (2-aminophenol) | 205 |

Example I

The preferred method for preparing the N,N'-bis(4-hydroxyphenyl) 1,4-benzenedisulfonamide comprises dissolving one mole of a disulfonyl chloride in a ketone, such as methylethyl ketone, and reacting same at room temperature with two moles of an aminophenol which has been dissolved in water containing one mole of sodium carbonate. The sodium carbonate acts as a hydrochloric acid acceptor preventing a reaction of this acid product with the aminophenol. In so acting, the sodium carbonate reacts with the hydrochloric acid to give a salt and carbonic acid with the carbonic acid decomposing to carbon dioxide and water. The mixture is then filtered and the residue is dried. The residue is next washed in warm water to remove the 4-aminophenol hydrochloride. The washed residue can further be purified by dissolving it in dilute sodium hydroxide, adding decolorizing charcoal, filtering and acidifying the filtrate to precipitate the N,N'-bis(4-hydroxyphenyl) 1,4-benzenedisulfonamide. The compound is then filtered, washed with water, and dried, and when dry, has a decomposition temperature of 536° F. The intermediate may further be purified by dissolving it in alcohol. Water is then added until the intermediate precipitates. The intermediate is removed by filtration and finally dried.

When trisulfonyl chloride is used as an ingredient, 3 moles of the aminophenol are used instead of 2, as above, and 1½ moles of sodium carbonate in lieu of the 1 mole above specified. By appropriate selection of ingredients any of the listed intermediates may thus be produced.

Example II

Another method for the preparation of the N,N'-bis(4-hydroxyphenyl) 1,4-benzenedisulfonamide and the other intermediates of the invention comprises reacting 1 mole of 1,4-benzenedisulfonyl chloride and 4 moles of 4-aminophenol, 2 moles of which latter are utilized as hydrogen chloride acceptors functioning in a manner similar to the sodium carbonate of Example I. If other acceptors are used in either of the exemplary methods herein set forth, as for example, metal hydroxides, metal carbonates or a basic solvent such as pyridine, it is important that they not react with one of the reagents as this will adversely affect the yield of the intermediate. The 1,4-benzenedisulfonyl chloride is dissolved in a hydrocarbon solvent, such as toluene, and the 4-aminophenol is added. The mixture is agitated for four hours at 100° C. and is then filtered and the residue dried. The residue is then washed with warm water to remove the 4-aminophenol hydrochloride. The compound can further be purified by dissolving it in dilute sodium hydroxide, adding decolorizing charcoal, filtering and acidifying the filtrate to precipitate the N,N'-bis (4-hydroxyphenyl) 1,4-benzenedisulfonamide. The compound is next filtered, washed with water and finally dried. When dry it has a decomposition temperature of 536° F.

As with the case of Example I, other polysulfonyl chlorides can be used in place of the 1,4-benzenedisulfonyl chloride and other aminophenols can be used in the place of the 4-aminophenol to produce the above indicated intermediates. It is to be noted however, that the isolation of the product is accomplished by simpler technique when 1,4-benzenedisulfonyl chloride and 4-aminophenol are used.

The intermediates of this invention can be converted into epoxy resins by treatment with epichlorohydrin or can be cross-linked with formaldehyde to produce a phenol-formaldehyde type resin. The epoxide is prepared by adding 4 equivalents (an excess) of epichlorohydrin to 1 mole of the intermediate. This solution is heated to 90° C. and kept at this temperature until the reaction is complete. The conversion to the epoxide proceeds slowly and the extent of reaction is measured by adding a solution of 10% sodium hydroxide. However, if the concentration of sodium hydroxide becomes too great, polymerization may occur with the result that the desired epoxide will not be produced. For this reason, the indicator phenolphthalein is added. This indicator turns red when the critical level of sodium hydroxide has been reached. When two equivalents of sodium hydroxide have been used, the reaction is complete. This takes approximately 8 hours. The excess solvents are then decanted off and the epoxide is washed several times with water to remove salt, unreacted sodium hydroxide, and phenolphthalein. It is then dried under vacuum at 50° C. to remove water and unreacted epichlorohydrin.

An excellent heat resistant coating has been prepared from the above epoxide using the curing agent pyromellitic dianhydride, dissolved in methyl ketone. The composition has been sprayed on aluminum panels and cured at 150° F. for 4 hours. The result is a tough chemical resistant coating able to withstand 500° F. for 2 hours.

What I claim is:
1. N,N' - bis(hydroxyphenyl) 1,4 - benzenedisulfonamide.
2. N,N' - bis(hydroxyphenyl) 1,3 - benzenedisulfonamide.
3. N,N'-bis(hydroxyphenyl) 1,5-naphthalenedisulfonamide.
4. N,N' - bis(hydroxyphenyl) 4,4' - biphenyldisulfonamide.
5. N,N',N''-tris(hydroxyphenyl) 1,3,5-benzenetrisulfonamide.
6. A compound of the formula:

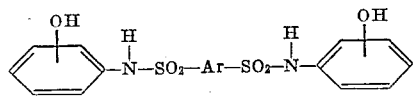

wherein Ar is a member selected from the group consisting of 1,3 phenylene and 1,5 naphthalene.

References Cited
UNITED STATES PATENTS 2,352,950 7/1944 Gates _____ 260—556
2,496,650 2/1950 Aelony _____ 260—556

FOREIGN PATENTS 542,654 6/1957 Canada.

OTHER REFERENCES

Raghaven et al.: Current Science, vol. 16, pp. 344–345 (1947).

JOHN D. RANDOLPH, *Primary Examiner.*

WALTER A. MODANCE, IRVING MARCUS,
*Examiners.*

EGON BERG, *Assistant Examiner.*